SNELL & TUCKER.
Cutting Metal Bars.
No. 82,886.
Patented Oct. 6, 1868.
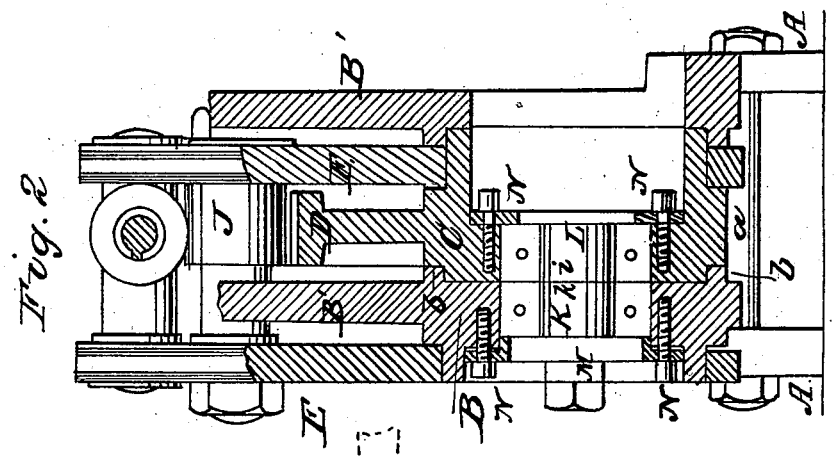
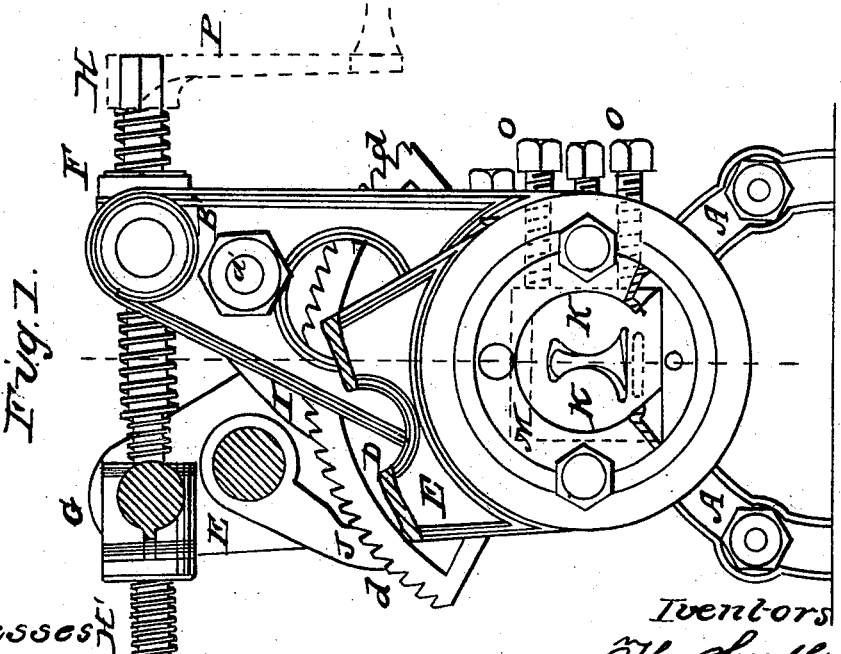

United States Patent Office.

THEODORE SNELL AND WILLIAM TUCKER, OF PHILADELPHIA, PENNSYLVANIA.

Letters Patent No. 82,886, dated October 6, 1868.

---

IMPROVED APPARATUS FOR CUTTING METALLIC BARS.

---

*The Schedule referred to in these Letters Patent and making part of the same.*

---

TO ALL WHOM IT MAY CONCERN:

Be it known that we, THEODORE SNELL and WILLIAM TUCKER, both of the city and county of Philadelphia, in the State of Pennsylvania, have invented a new and useful Improvement in Shears for Cutting Metal Bars; and we do hereby declare that the following is a sufficiently full, clear, and exact description thereof to enable one skilled in the art to which our said invention appertains to make and use it, reference being had to the accompanying drawings, which form a part of this specification.

Our invention relates to rotary shears for cutting metal bars of any form, and consists—

First, in placing the metal to be cut so nearly in the centre of the fulcrum that it will be severed by a tortional or turning motion of one part in relation to the other.

Second, in the employment of divided or clamping-dies for introducing and clamping the bars to be cut.

Third, in devices for moving the cutters or dies.

In the drawings—

Figure 1 represents a side elevation of our improved shears, with certain parts cut away to expose parts within or behind them.

Figure 2 represents a vertical section in the plane indicated by the line $x\ x$, fig. 1.

A represents a supporting-frame, in which are mounted a pair of annular die-stocks, B C, one of which, C, may turn upon or in relation to the other, B.

B' B' represent a pair of rigid arms, projecting upward from the stationary die-stock B. A B B' thus constitute parts of a single rigid frame, which may be formed of two castings permanently connected by bolts, $a\ a'$.

D is a segment or sector-shaped lever, projecting upward from the turning-die C, and formed on its periphery with ratchet-teeth, $d\ d$.

E E are a pair of arms, fitted to turn concentrically upon both the stationary and moving die-stocks.

F and G are nuts, with threads of unequal pitch, mounted on trunnions in the ends of the arms B' and E, respectively.

H' H' is a screw, made up of two unequal threads, fitting the nuts F and G.

I is a pawl attached to the stationary arms B', and J a similar pawl, attached to the movable arms E. Both these pawls, I J, engage with the rack $d\ d$.

K L represent the cutting-dies, fitted in square or irregular sockets in the respective die-stocks B C, and secured in position by annular plates M M and screws N N, or other suitable means.

The drawings represent dies adapted for cutting railroad bars. Each die is made in two pieces, which may be separated to receive the battered or distorted end of a rail, and afterwards clamped together by screws O O. The screw H' H' may be worked by a crank, P, or other suitable appliance. A concentric collar, $b$, on the die-stock B, constitutes a bearing for the turning-die C, and thus affords direct relative support to the working faces of the two dies.

Operation.

The bar to be severed is inserted in the apertures of the two dies K L.

Supposing the end H of the screw to have five threads to an inch, and the end H' six threads, it is manifest that at each revolution of the screw it will pass one-fifth of an inch through the stationary nut F, and only one-sixth of an inch through the nut G on the movable arms E. The effect will, therefore, be to move the extremities of the arms E one-thirtieth of an inch from or toward the arms B' at every revolution of the screw. By turning the screw forward, the arms E will be slowly driven away from the stationary arms B', and will carry with them the segment-lever D, by the pawl J engaging in the rack $d$. This will impart a slow and very powerful rotation to the die L, and the cutting-face $l$, turning upon or against the cutting-face $k$ of the stationary die K, will sever the bar by a tortional cut, making the bar itself the fulcrum of the lever, relieving the machine of much strain and friction, and affording immense power, with a comparatively small weight of metal.

The screw having reached the extremity of its motion, is turned back, the pawl I holding the motion that has been made, and the pawl J passing back over the rack until it takes into a new set of teeth. The forward turning is then resumed, and this intermittent motion is continued until the bar is completely severed.

In the present illustration, the bar to be cut is placed precisely in the axis or centre of motion of the die L. This is preferable with bars whose angular or irregular form prevents their turning in the dies. For cutting round bars, we prefer to make the apertures slightly eccentric to the motion of the dies, to an extent less than the diameter of the bars, and we employ any suitable device to prevent the bar turning within the dies. We thus preserve the principle of tortional cutting or distinctive action, the particles of metal being severed by the action of contiguous particles against them, so that the bar will be completely severed, even though a portion of the aperture in one die be not covered by the other die.

By our method of placing the bearing-faces of the dies closely up to each other, we combine the shearing and tortional action, and apply the entire twisting force to that part where the bar is to be severed.

By the use of the levers and differential screw, and placing the bar in the centre of rotation, we produce a mechanical combination of immense power, and are enabled to provide railroads with a portable machine of moderate weight, with which two men can readily sever railroad rails.

This renders the invention valuable in railroad construction and repairs, such as cutting off lateral ends of rails, laying turn-outs and switches, and various other purposes. We do not limit ourselves to the cutting of bars of this particular form, but propose to adapt the machine to cutting bars of any shape, and, by the use of changeable dies, may adapt a single machine for various uses.

By using dies with oblique apertures, the shears may be adapted for cutting off rails or bars at any desired angle of obliquity.

Having thus described our invention, the following is what we claim as new therein, and desire to secure by Letters Patent:

1. Locating the two cutting-dies in their respective die-stocks, so that a bar placed within them to be cut shall extend in the direction, and occupy the position, of the axis of rotation of one or both of said cutting-dies, substantially in the manner described.

2. In a rotary shears, constructed as specified in the preceding clause, we further claim the dies K L, made each in two parts, and pressed together by screws C'', for the purpose of clamping the metal bars between them, as explained.

3. We claim the differential screw H H', in combination with the levers B' E, die-stocks B and C, and supporting-frame A, substantially as described.

4. We claim the pawl J and toothed segment-lever D d, in combination with the arm E and the stock C, for the purpose stated.

THEODORE SNELL.
WILLLIAM TUCKER.

Witnesses:
WM. B. DAYTON,
DAVID L. COLLIER.